United States Patent [19]

Sasaki

[11] Patent Number: 4,779,102

[45] Date of Patent: Oct. 18, 1988

[54] HEAD DRIVE SYSTEM FOR A THERMAL PRINTER

[75] Inventor: Eiichi Sasaki, Sagamihara, Japan

[73] Assignee: Ricoh Company, Ltd., Tokyo, Japan

[21] Appl. No.: 937,014

[22] Filed: Dec. 2, 1986

[30] Foreign Application Priority Data

| | | | |
|---|---|---|---|
| Dec. 5, 1985 | [JP] | Japan | 60-274075 |
| Dec. 5, 1985 | [JP] | Japan | 60-274076 |
| Jan. 16, 1986 | [JP] | Japan | 61-7023 |

[51] Int. Cl.[4] .......... G01D 15/10; B41J 3/20

[52] U.S. Cl. .......... 346/76 PH; 400/120

[58] Field of Search .......... 346/76 PH; 430/348; 400/120

[56] References Cited

U.S. PATENT DOCUMENTS

| | | | |
|---|---|---|---|
| 4,141,018 | 2/1979 | Mizuguchi et al. | 346/76 R |
| 4,531,133 | 7/1985 | Leng | 346/76 PH |
| 4,560,988 | 12/1985 | Moriguchi et al. | 346/1.1 |

*Primary Examiner*—E. A. Goldberg
*Assistant Examiner*—Gerald E. Preston
*Attorney, Agent, or Firm*—Cooper & Dunham

[57] ABSTRACT

In a thermal or a thermal transfer printer using a thermal head which has heating elements arranged in one line in a main scanning direction, a thermal head drive system for printing out dots by multi-step modulation is disclosed. The heating elements are divided into an odd and an even dot groups and driven group by group on a time division basis. One line of data are recorded such that the odd dots and the even dots which neighbor each other in the main scanning direction are offset in a subscanning direction. When the elements which are next to a particular one of the elements are of the maximum drive level, they are driven at the same time. Further, those heating elements which are of the same level are driven at a time.

8 Claims, 14 Drawing Sheets

| DATA | X | C | B | A | Y |
|---|---|---|---|---|---|
| | 1 | 0 | 0 | 0 | 5 |
| | 1 | 1 | 0 | 0 | 4 |
| | 2 | 0 | 0 | 0 | 7 |
| | 2 | 1 | 0 | 0 | 6 |
| | 3 | 0 | 0 | 0 | 10 |
| | 3 | 0 | 0 | 1 | 9 |
| | 3 | 0 | 1 | 0 | 9 |
| | 3 | 1 | 0 | 0 | 9 |
| | 3 | 1 | 0 | 1 | 8 |
| | 3 | 1 | 1 | 0 | 8 |
| | 3 | 1 | 1 | 1 | 7 |

2 msec/dot 1.4 msec/dot

FIG. 16

| POINT | DATA |
|---|---|
| PICTURE DATA | 1 2 3 0 1 0 3 1 2 0 3 0 1 2 ······ 3 3 |
| DATA SEPARATOR 40 | |
| LEVEL 1 | 1 0 0 0 1 0 0 1 0 0 0 0 1 0 ······ 0 0 |
| LEVEL 2 | 0 1 0 0 0 0 0 0 1 0 0 0 0 1 ······ 0 0 |
| LEVEL 3 | 0 0 1 0 0 0 1 0 0 0 1 0 0 0 ······ 1 1 |
| PICTURE DATA ON PREVIOUS LINE | 0 3 2 1 0 3 0 2 0 1 1 1 0 1 ······ 2 2 |
| DOT DETECTOR 44 | 0 1 1 1 0 1 0 1 0 1 1 1 0 1 ······ 1 1 |

| DOT | X C B A | PULSE WIDTH |
|---|---|---|
| | 1 0 0 0 | $t_4$ |
| | 1 0 0 1 | $t_3$ |
| | 1 0 1 0 | $t_3$ |
| | 1 0 1 1 | $t_2$ |
| | 1 1 0 0 | $t_2$ |
| | 1 1 0 1 | $t_2$ |
| | 1 1 1 0 | $t_2$ |
| | 1 1 1 1 | $t_1$ |

| | Ta | Tb | Tc | Td | |
|---|---|---|---|---|---|
| LEVEL 1 | 0.6 | 0.1 | 0.1 | 0.2 | (msec) |
| LEVEL 2 | 0.8 | 0.15 | 0.15 | 0.3 | |
| LEVEL 3 | 1.2 | 0.2 | 0.2 | 0.4 | |

HEAD DRIVE SYSTEM FOR A THERMAL PRINTER

BACKGROUND OF THE INVENTION

The present invention relates to a thermal or a thermal transfer printer of the type using a line-type thermal head and, more particularly, to a head drive system associated with such a printer for printing out dots by multi-step modulation. Printers to which the present invention applicable include printers, facsimile terminals and copiers which are implemented with a line-type thermal head.

Generally, a thermal printer or a thermal transfer printer uses a thermal head in which heating elements each being representative of a dot are arranged in one line in a main scanning direction. While a paper is fed by a stepping motor one line at a time in a subscanning direction, the thermal head is driven to generate heat in accordance with data to be recorded so as to print out data line by line. A problem with this type of thermal printer is that when a continuous string of dots are recorded, heat accumulated in the nearby heating elements effect each other to increase the density of dots printed out, resulting in an irregular density distribution as a whole. Although the mutual influence of dots which neighbor each other in the subscanning direction is not so serious because of the feed time of the paper, that of dots which neighbor in the main scanning direction is critical.

In the light of the above, there has been proposed a head drive system which divides the heating elements into an odd dot group and an even dot group and drives the two dot groups on a time division basis, as disclosed in Japanese Patent Application No. 59-217962 by way of example. Although this scheme may successfully preclude the mutual influence of heating elements which neighbor each other in the main scanning direction, it brings about another problem in relation to the representation of halftone. Specifically, when dot modulation is performed to change the size of dots to thereby render halftone, blurring occurs between those dots which have a usual area and those which have a reduced area for rendering halftone and/or those dots which are aligned in an oblique direction become spaced apart from each other. Another drawback inherent in the odd-even dot group scheme is that the energy efficiency is poor in the event of recording a solid picture.

Another drive system for a line-type thermal head which is directed to a uniform density distribution is disclosed in Japanese Laid-Open Patent Publication (Kokai) No. 57-34986. The system disclosed is such that when the same heating element is driven continuously, the width of pulses to be applied thereto is reduced and, in addition, a heating element next to a heating element which has just been driven is also applied with a pulse having a reduced width. This scheme, however, is unsuitable for multi-step dot modulation.

Further, there has been proposed a method of automatically adjusting the density of dots printed out. Specifically, the method begins with detecting the level data on a particular heating element to be driven and heating elements located at both sides of that particular heating element. Based on a weight for density compensation which corresponds to the level data, power applied to the particular heating element is controlled in terms of the duration of application or the peak value.

This kind of method, however, renders not only an apparatus for practicing the method but also the data processing complicated.

SUMMARY OF THE INVENTION

It is therefore a first object of the present invention to provide a head drive system for a thermal printer which, despite that heating elements of a thermal head are divided into an odd and an even dot groups and driven on a time division basis to eliminate an irregular density distribution, is capable of printing out a picture without allowing a blur or a gap to occur between the dots printed out.

It is a second object of the present invention to provide a head drive system for a thermal printer which is capable of printing out a solid picture with a minimum of energy.

It is a third object of the present invention to provide a head drive system for a thermal printer which enhances simplification of a density control circuit and improves a control characteristic (accuracy).

It is another object of the present invention to provide a generally improved head drive system for a thermal printer.

A system for driving a thermal head which has heating elements arranged in one line in a main scanning direction of the present invention comprises a device for dividing the heating elements into an odd and an even dot groups with respect to one line of data to be recorded and driving the odd and even dot groups on a time division basis to generate heat, and a device for feeding a paper such that the odd dots and the even dots recorded on a same line are offset from each other in a subscanning direction.

The above and other objects, features and advantages of the present invention will become more apparent from the following detailed description taken with the accompanying drawings.

BRIEF DESCRIPTION OF THE DRAWINGS

FIG. 16 is a chart for explaining a data processing mode;

DESCRIPTION OF THE PREFERRED EMBODIMENTS

To better understand the present invention, a brief reference will be made to a prior art head drive system.

Figure 1:
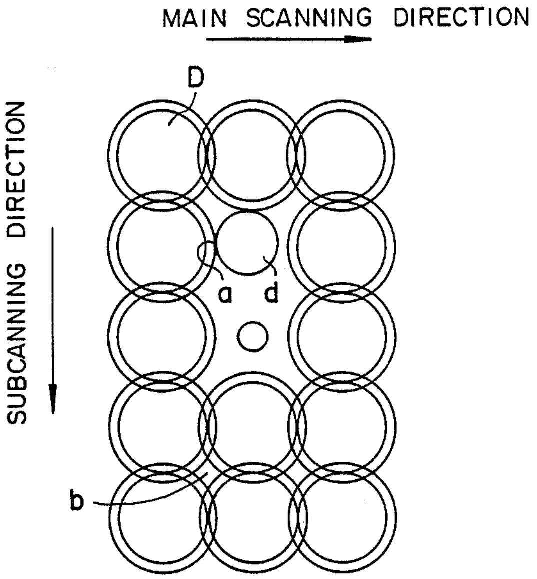
FIG. 1 PRIOR ART
FIG. 1 shows dots which are printed out by a prior art head drive system.

As previously discussed, a head drive system known in the art is such that heating elements are divided into an odd dot group and an even dot group and driven on a time division basis. Although this scheme may successfully preclude the mutual influence of heating elements which neighbor each other in the main scanning direction, it brings about another problem in relation to the representation of halftone. Specifically, as shown in FIG. 1, when dot modulation is preformed to change the size of dots to thereby render halftone, a blur a occurs between those dots D which have a usual area and those d which have a reduced area for rendering halftone and/or those dots D which are aligned in an oblique direction become spaced apart from each other as at b.

Hereinafter will be described a preferred embodiment of the present invention which is directed to the first object of the present invention as previously stated.

Figure 2:
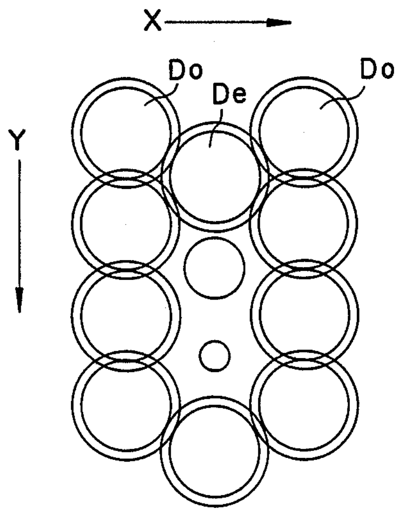
FIG. 2 shows dots which may be printed out by a head drive system in accordance with one embodiment of the present invention.

As shown in FIG. 2, in accordance with this particular embodiment, when odd dots $D_o$ and even dots $D_e$ in a main scanning direction X are printed out on a time division basis, the dots $D_o$ and $D_e$ which neighbor each other in the direction X are offset by ½ dot from each other in a subscanning direction Y.

Figure 3:
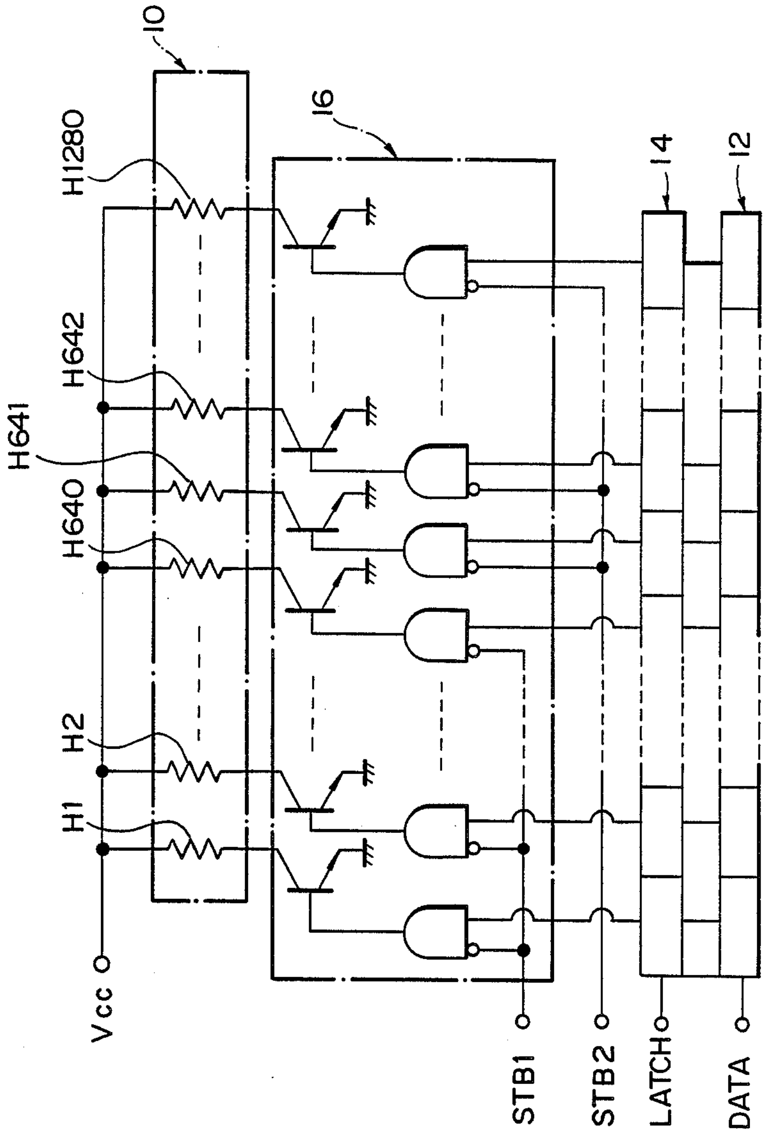
FIG. 3 is a diagram showing a specific construction of a thermal head drive circuit.

Referring to FIG. 3, there is shown a specific construction of a thermal head drive circuit for practicing the head drive system in accordance with the first embodiment. In this construction, a thermal head 10 includes heating elements H1 to H1280 which are arranged in a dot matrix and in one line in the main scanning direction X. The heating elements H1 to H1280 are divided into two blocks, i.e. a former block and a latter block. One line of data DATA to be recorded which are fed serially to the drive circuit are held by a latch 14 via a shift register 12. In response to a first strobe STB1, the heating elements H1 to H640 in the former block of the head 10 are driven by a driver 16 according to the data being held by the latch 14. Then, in response to a second stroke STB2, the heating elements H641 to H1280 are driven by the driver 16 according to the data being held by the latch 14. A latch signal is represented by LATCH in the drawing.

Figure 4:
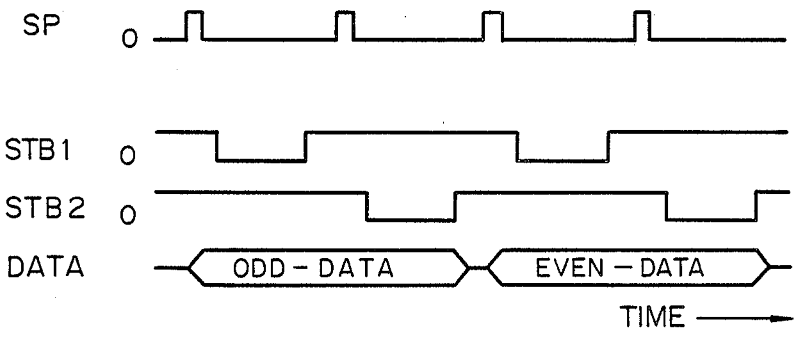
FIG. 4 is a timing chart showing various signals which appear in the circuit of FIG. 3.

In the above construction, as shown in FIG. 4, one line of data DATA are divided into data associated with an odd dot group and those associated with an even dot group. The resulting odd data (non-printing or dummy data being inserted in even data portions) ODD-DATA and even data (non-printing or dummy data being inserted in odd data portions) EVEN-DATA are fed to the shift register 12 sequentially. Further, the stepping amount of a stepping motor adapted to feed a paper in the subscanning direction Y is equal to ¼ of a dot having an ordinary size, so that the head 10 may become aligned with the next line on a paper when the paper has been fed four steps in total.

In operation, one line of odd data ODD-DATA are fed and, then, only odd ones of the heating elements H1 to H640 which belong to the former block of the head 10 are driven by a strobe STB1 according to the data so as to generate heat. This is followed by applying a one-step pulse to the stepping motor to feed a paper by ¼ dot in the subscanning direction. Then, only odd ones of the heating elements H641 to H1280 which belong to the latter block are driven by a strobe STB2 according to the data so as to generate heat.

Subsequently, even data EVEN-DATA on the same line as the above-mentioned are fed. Under this condition, a one-step pulse is applied to the stepping motor to feed the paper by another ¼ dot in the subscanning direction, whereafter the even ones of the heating elements H1 to H640 of the head 10 are driven by another strobe STB1 according to the data. Then, a one-step pulse is applied to the stepping motor to feed the papar farther by ¼ dot in the subscanning direction, whereafter the odd ones of the heating elements H641 to H1280 of the head 10 are driven by another strobe STB2 according to the data. Finally, a one-step pulse is applied to the stepping motor to feed the paper farther by ¼ dot in the subscanning direction, thereby completing one line of recording.

FIG. 4 shows a relationship between the various signals which appear in the drive circuit as described above. In FIG. 4, SP designates the step pulses which are fed to the stepping motor.

Figure 5:
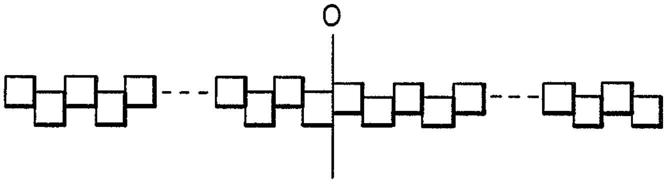
FIGS. 5 and 6 show models of a recording.
Figure 6:
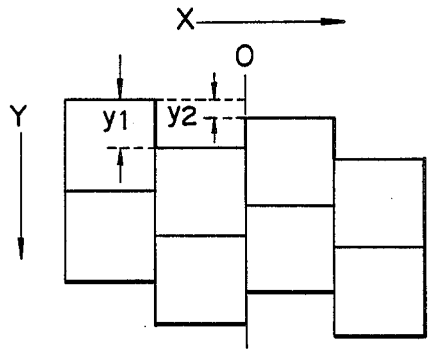

In FIGS. 5 and 6, there are shown data models which are recorded by the above procedure. In FIG. 6, y1 is representative of an offset by ½ dot, y2 an offset by ¼ dot, and O the center position between the former and latter blocks of the head 10.

Figure 7:
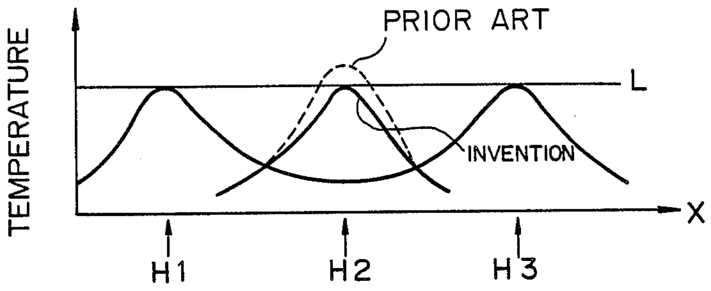
FIG. 7 is a plot representative of a temperature distribution characteristic which is provided by driving odd dots and even dots of a thermal head on a time division basis.

Referring to FIG. 7, the distribution of temperature which is generated in the individual heating elements of the heat 10 is shown. If the even heating element H2 is driven immediately after the odd heating elements H1 and H3 have been driven, the temperature of the element H2 being driven will be elevated beyond a predetermined level L, as indicated by a dotted line, under the influence of heat which is accumulated in the elements H1 and H3. In accordance with this embodiment of the present invention, after the odd heating elements H1 and H3 have been driven, the paper is fed by ¼ dot and, then, the even heating element H2 is driven. Such a time gap between the drive of the odd elements H1 and H3 and that of the even element H2 successfully prevents the element H2 from being effected by heat accumulated in the elements H1 and H3; the temperature of the element H2 being driven is maintained at the predetermined level L, as indicated by a solid line in the drawing.

Another advantage attainable with this embodiment is that noise generated by the stepping motor is reduced since the intervals of the step pulses SP for driving the stepping motor are uniform. Applying four step pulses at a time to a stepping motor every time one line of recording is completed, as has heretofore been practiced, would cause the motor to be driven in an intermittent fashion to generate much noise, and such highspeed drive would be heavy in view of motor torque.

As described above, a head drive system for a thermal printer in accordance with this embodiment is capable of recording a picture of good quality without encountering an irregular density distribution or without causing a blur and a gap between dots printed out. This advantage is derived from the fact that heating elements of the head are divided into an odd and an even dot groups and driven on a time-division basis, and that one line of data are recorded such that odd dots and even dots which neighbor each other in the main scanning direction are offset from each other in the subscanning direction.

Another embodiment of the present invention which is directed to the second object as previously stated will now be described.

In principle, this embodiment is such that heating elements of a thermal head are divided into an odd and an even dot groups, and the odd elements are driven before the even elements. Stated another way, odd dots are transferred after even dots. Further, weights 0, 1, 2 and 3 are used as drive levels. Let the heating element of level 0 be the element S0, the element of level 1 be the element S1, the element of level 2 be the element S2, and the element of level 3 be the element S3. Then, in this particular embodiment, the odd elements are driven under the following three different conditions:

(1) That an even S3 appearing between two elements both of which are S3 be put into the odd group;

(2) That an even S3 appearing between two elements one of which is S3 and the other is S0 be also put into the odd group; and (3) That even elements other than those which come under the conditions (1) and (2) be regarded as belonging to the even group.

Figure 8:
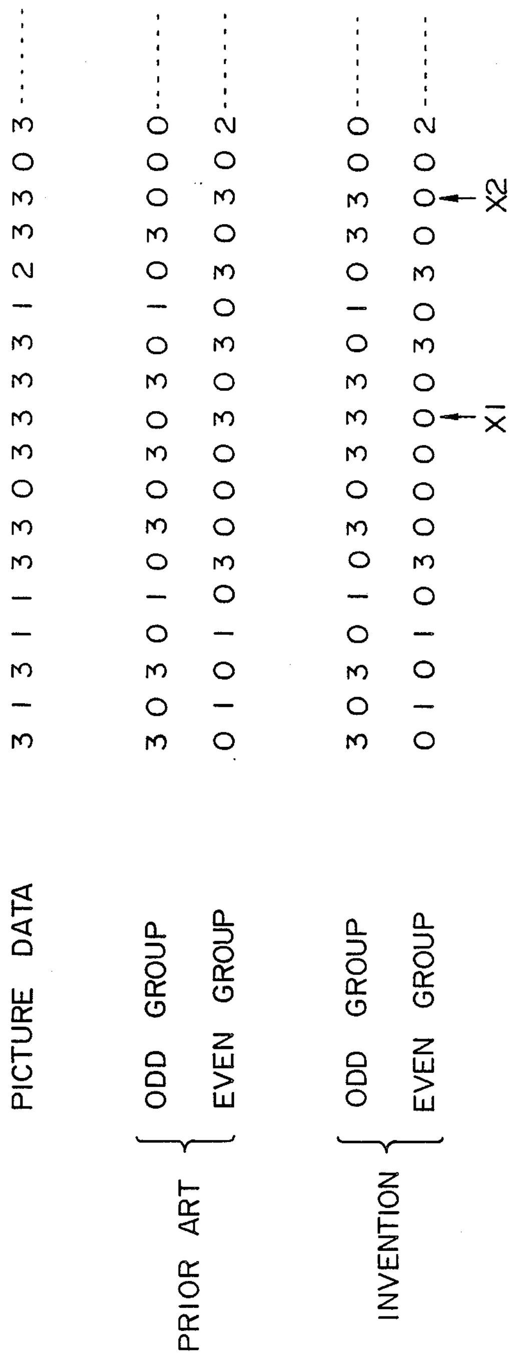
FIG. 8 shows a drive mode in accordance with another embodiment of the present invention together with a prior art drive mode.

Referring to FIG. 8, the drive mode as stated above is shown together with a prior art drive mode for comparison purpose. As shown, the even element at a point X1 falls under the condition (1) as mentioned above, and the even element at a point X2 falls under the condition (2). Hence, these particular elements are driven simultaneously with the odd group.

Figure 9:
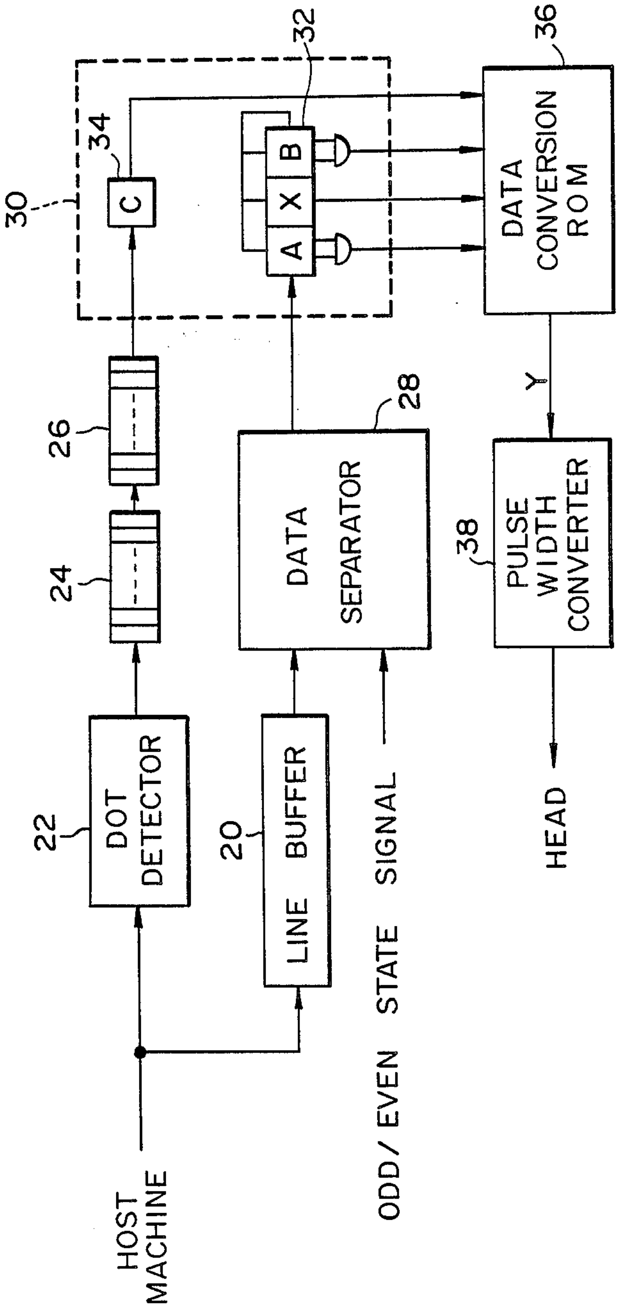
FIG. 9 is a block diagram of an electric circuit.

Referring to FIG. 9, an electric circuit for implementing such a manner of drive is shown in a block diagram. As shown, one line of picture data fed from a host machine are applied to an M line buffer 20 to be stored therein and, at the same time, to a dot detector 22 which serves to determine presence/absence of a dot. A line shift register 24 latches a ONE when a dot is present as determined by the dot detector 22, and a ZERO when a dot is absent. The data latched by the line shift register 24 are transferred to an S line buffer 26 when the next one line of data are entered.

The one line of picture data stored in the M line buffer 20 as stated above are separated into odd data and even data by a data separator 28 in response to an odd-/even state signal, the odd and even data being routed to a shift register 32 which is included in a decision section 30. Simultaneously, the data (C) stored in the line buffer 26, i.e., ONEs and ZEROs which are representative of presence/absence of dots on one line are fed to a register 34 of the decision section 30 sequentially. The decision section 30 determines whether both of dots A and B which are located at both sides of a particular odd element, or observed dot, X are of level 3 or at least one of them is of level 3, and whether or not a dot was present in the dot data C corresponding to the observed odd element which appeared one line before.

Figures 10, 11:
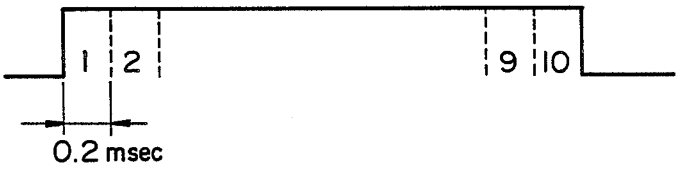
FIG. 10 is a chart showing correspondence between neighboring dots and data conversion values.
FIG. 11 shows a relationship between the data conversion values and pulse widths.
Figure 12:
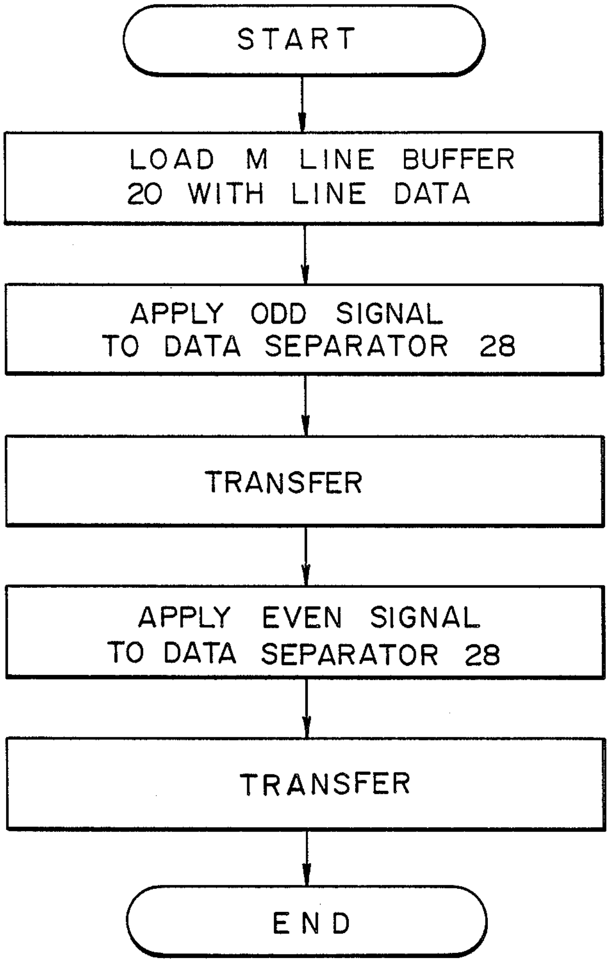
FIG. 12 is a flowchart outlining the operation.
Figure 13:
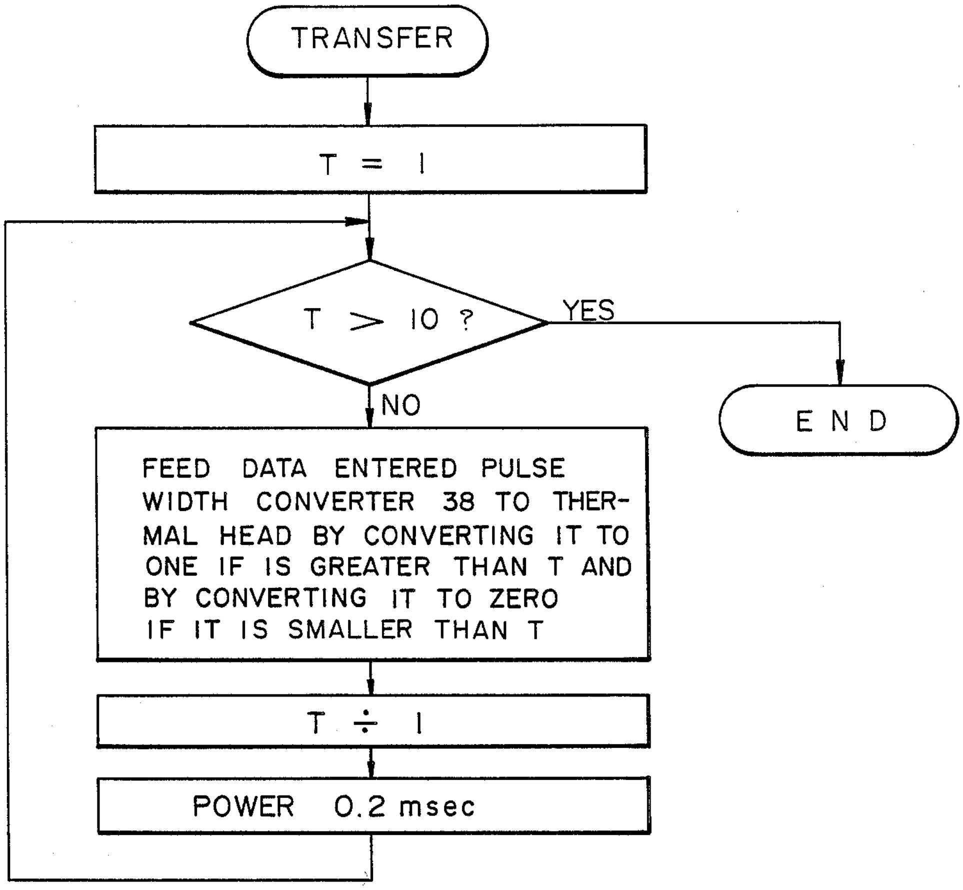
FIG. 13 is a flowchart demonstrating a particular transfer operation.

Thereafter, the contents decided by the decision section 30 are each weighted according to a data conversion ROM 36 and, thereby, converted to a particular value Y as shown in FIG. 10. The value Y is further converted by a pulse width converter 38 to an electric signal whose pulse width is associated with the particular value Y, as shown in FIG. 11. Finally, the electric signal is fed to a thermal head to transfer the data. Such a procedure is outlined in a flowchart in FIG. 12. A specific transfer operation is also shown in a flowchart in FIG. 13.

Figure 14A:
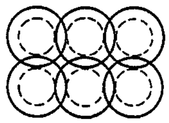
FIG. 14A PRIOR ART
FIGS. 14A and 14B show exemplary solid picture which are recorded by the present invention and the prior art in a contrastive manner.
Figure 14B:
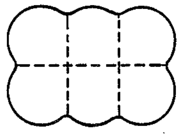

In this manner, the system in accordance with this embodiment is constructed to, when the elements which neighbor a certain element are of maximum drive level, drive them at the same time. Experiments showed that while the prior art system has to assign 2 msec to each dot to record a solid picture as shown in FIG. 14A, in accordance with this embodiment 1.4 msec per dot is sufficient in recording a solid picture as shown in FIG. 14B.

The above effect remains the same even if the relationship between the odd and even groups is reversed.

As described above, this embodiment requires a minimum of total energy since it is capable of recording a solid picture with small energy without affecting the reproducibility of halftone levels, which is a merit particular to the odd/even separation type drive system.

Another embodiment of the present invention which is directed to the third object as previously stated will be described hereinafter.

Figure 15:
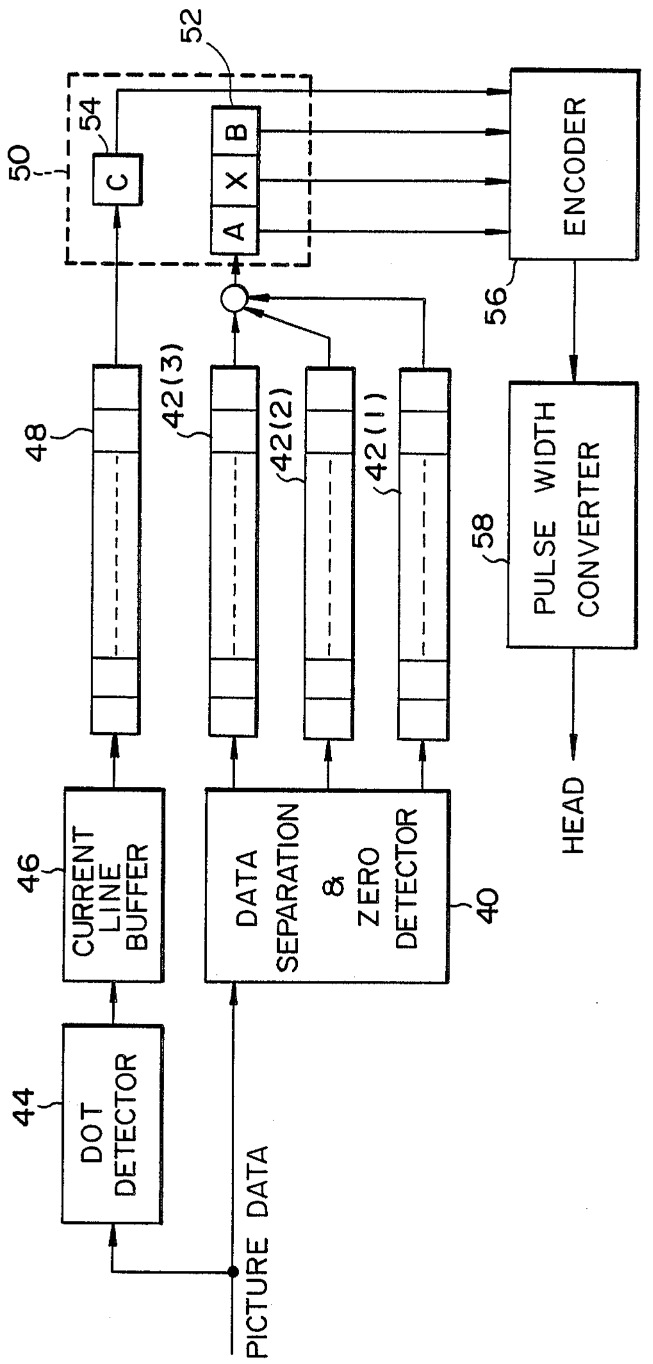
FIG. 15 is a block diagram showing an electric circuit in accordance with another embodiment of the present invention.

In this embodiment, picture data are assumed to have any of four different weights, or levels, 0, 1, 2 and 3. FIG. 15 shows an electric circuit for practicing this embodiment in a block diagram. As shown, one line of picture data fed from a host machine are separated into the levels 1, 2 and 3 by a data separator and zero detector 40, whereby for each of the levels a ONE is produced when the level data is present and a ZERO when it is absent. The binary codes, ONEs and ZEROs, which are associated with each level are stored in one of level buffers 42 (1), 42 (2) and 42 (3) assigned therewith. A dot detector 44, on the other hand, produces a ONE when the level of data is 1, 2 or 3 and a ZERO when it is 0. The outputs of the dot detector 44 are stored in a current line buffer 46 and, upon entry of data on the next line, transferred to a previous line buffer 48.

FIG. 16 shows the weights of picture data entered, the levels separated by the data separator 40 based on those weights, the weights of picture data appeared on the previous line, and the outputs of the dot detector 44 which correspond to the weights of the image data appeared on the previous line.

Figures 17, 18, 19:
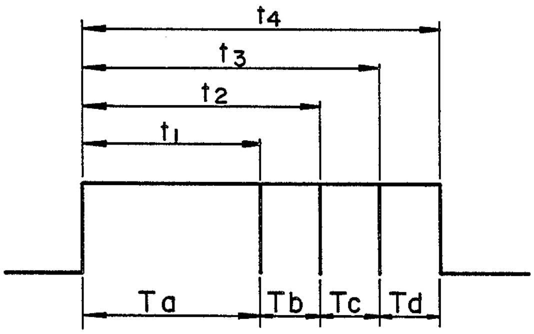
FIG. 17 is a chart showing a relationship between weights and pulse widths which are adapted to control heating elements.
FIG. 18 is a diagram for explaining the widths of pulses.
FIG. 19 is a table for explaining that the duration of a pulse applied to a heating element depends upon the level.

The contents of each of the level buffers 42 (1), 42 (2) and 42 (3) are sequentially fed to a shift register 52 of a comparing section 50 while, at the same time, the contents of the previous line buffer 48 are sequentially fed to a register 54 of the comparing section 50. An encoder 56 which is associated with the comparing section 50 weights on a level-by-level basis the data stored in the shift registers 52 and 54 by referencing the binary codes assigned to the elements A and B next to the observed element X and a code which shows whether or not a dot was present in the dot data C on the observed element which appeared one line before. The weights are shown in the left column of FIG. 17. Thereafter, a pulse width converter 58 converts the weights to pulses whose widths correspond to the weights on a level-by-level basis, the pulses being applied to the individual heating elements in the order of the levels 1, 2 and 3. As shown in FIG. 18, the pulse has any of four different widths $t_1$, $t_2$, $t_3$ and $t_4$ which are related as ($t_1$=Ta), ($t_2$=Ta +Tb), ($t_3$=Ta+Tb+Tc), and ($t_4$=Ta+Tb+Tc+Td), where Ta, Tb, Tc and Td are reference times. The reference times Ta, Tb, Tc and Td differ from one level to another such as shown in FIG. 19.

Figure 20:
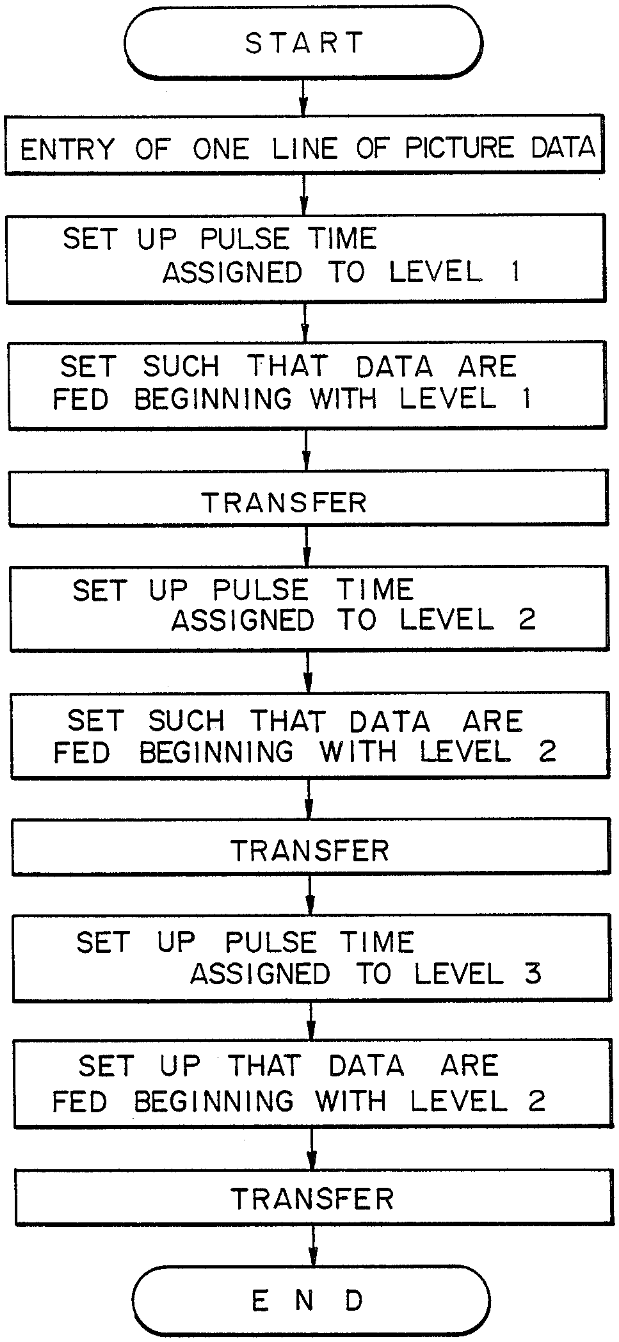
FIG. 20 is a flowchart outlining the operation of the entire arrangement.
Figure 21:
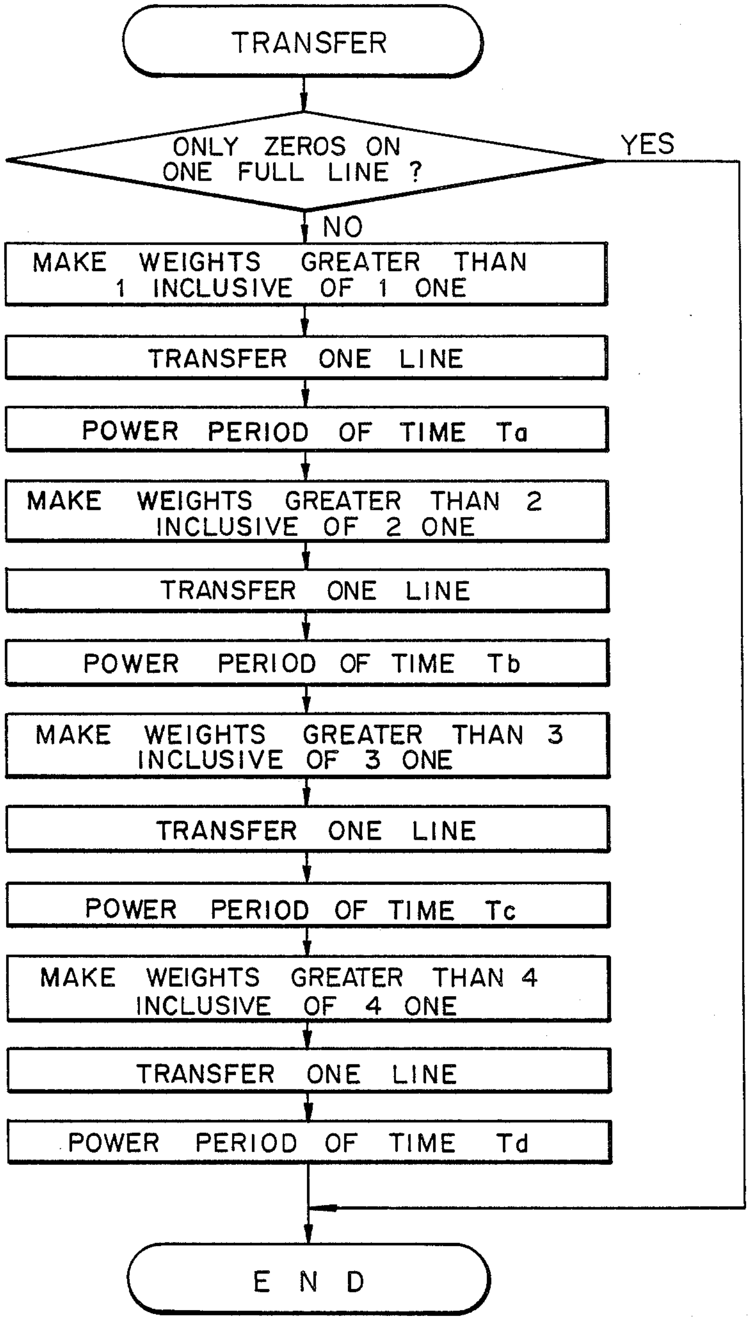
FIG. 21 is a flowchart demonstrating a particular transfer operation.

FIG. 20 shows the outline of the procedure as described above, while FIG. 21 shows a particular transfer operation which is performed level by level.

As described above, in accordance with this embodiment, those heating elements which are of the same level are driven at the same time. This enhances reproducibility of the area and density of a dot of each level and simplifies the apparatus construction as well as data processing. In addition, a quality recording which is free from irregular density is achieved since a weight is determined by referencing dot presence/absence data on a particular heating element which appeared one line before and level data on two heating elements next to that element and the width of a pulse to be applied to that particular element is adjusted based on the weight.

Various modifications will become possible for those skilled in the art after receiving the teachings of the present disclosure without departing from the scope thereof.

What is claimed is:

1. A system for driving a thermal head which has heating elements arranged in one line in a main scanning direction, comprising:

means for dividing said heating elements into an odd dot group and an even dot group with respect to one line of data to be recorded and driving said odd and even dot groups on a time division basis to generate heat; and means for feeding recording paper such that the odd dots and the even dots recorded on a same line are offset from each other by a predetermined amount in a subscanning direction.

2. In a system for driving a thermal head which has heating elements which are arranged in one line in a main scanning direction by dividing said heating elements into an odd and an even element groups and said elements are selectively provided with drive levels which include a minimum drive level and a maximum drive level, the improvement wherein: (i) any of said heating elements which is included in one of said groups and is provided with a maximum drive level and is between heating elements both of which are provided with a maximum drive level, and (ii) any of said heating elements which is included in said one group and is provided with a maximum drive level and is between heating elements one of which is provided with a maximum drive level and the other is provided with a minimum drive level, is driven when said heating elements which belong to the other of said groups are driven.

3. In a system for driving a thermal head which has heating elements arranged in one line in a main scanning direction on the basis of level data which have a plurality of weights, the improvement wherein the level data for one line are separated on a level basis, and said heating elements of a same level are driven simultaneously.

4. The improvement as claimed in claim 3, wherein weighting is performed by referencing dot presence/absence data for a particular one of said heating elements which appeared one line before and level data for heating elements next to said particular element on a current line, a pulse to be applied to said particular element being adjusted in width based on said weighting.

5. A system for driving a thermal head which has heating elements arranged in one line in a main scanning direction, comprising:

means for powering the group of odd heating elements and the group of even heating elements on a time division basis; and means for causing relative motion between recording paper and said heating elements in a subscanning direction which is transverse to the scanning direction and for controlling said feeding and said time division powering of the heating elements to cause the odd dots and the even dots recorded on the same line of the paper by said heating elements to be offset from each other by a predetermined amount in said subscanning direction.

6. A system for driving a thermal head which has heating elements which are arranged in one line in a main scanning direction by dividing said heating elements into an odd and an even element groups and for selectively providing said elements drive signals at levels which include a minimum level and a maximum level, wherein: (i) any heating element which is included in one of said groups and is provided with a maximum level drive signal and is between heating elements both of which are provided with a maximum level drive signal, and (ii) any heating element which is included in said one group and is provided with a maximum level drive signal and is between heating elements one of which is provided with a maximum level drive signal and the other is of provided with a minimum level drive signal, is driven when said heating elements which belong to the other of said groups are driven.

7. A system for driving a thermal head which has heating elements arranged in one line in a main scanning direction on the basis of driving signal level data which have a plurality of weights, wherein the level data for one line are separated on a level basis and the heating elements of a same level in the line are driven simultaneously.

8. A system as in claim 7, wherein weighting is performed by referencing dot presence/absence data for a particular one of said heating elements which appeared one line before and level data for heating elements next to said particular element on a current line, and wherein the driving signal for said particular element is adjusted in width based on said weighting.

* * * * *